United States Patent
Choi (10) Patent No.: US 11,263,094 B2
(45) Date of Patent: *Mar. 1, 2022

(54) RECOVERING DYNAMIC SYSTEM DATA

(71) Applicant: INTERNATIONAL BUSINESS MACHINES CORPORATION, Armonk, NY (US)

(72) Inventor: Patricia Driscoll Choi, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/115,927

(22) Filed: Dec. 9, 2020

(65) Prior Publication Data

US 2021/0089412 A1 Mar. 25, 2021

Related U.S. Application Data

(63) Continuation of application No. 16/515,208, filed on Jul. 18, 2019, now Pat. No. 10,956,285.

(51) Int. Cl.
*G06F 12/00* (2006.01)
*G06F 11/14* (2006.01)
*G06F 11/07* (2006.01)

(52) U.S. Cl.
CPC ...... *G06F 11/1489* (2013.01); *G06F 11/0766* (2013.01); *G06F 11/1415* (2013.01); *G06F 11/1448* (2013.01); *G06F 11/1469* (2013.01)

(58) Field of Classification Search
None
See application file for complete search history.

(56) References Cited

U.S. PATENT DOCUMENTS

| 9,928,145 B2 | 3/2018 | Bish |
| 2016/0196193 A1 | 7/2016 | Gschwind et al. |
| 2018/0067814 A1 | 3/2018 | Bish et al. |

OTHER PUBLICATIONS

Anonymous, "Method for Automatic Backup and Recovery of Persistent Clustered Databases", IP.COM No. IPCOM000208537D, Jul. 12, 2011, 3 pages.

(Continued)

*Primary Examiner* — Jason W Blust
(74) *Attorney, Agent, or Firm* — Cantor Colburn LLP; Teddi Maranzano (57) ABSTRACT

Aspects of the invention include creating a collection of control blocks associated with one or more catalogs, each control block including an eye catcher value and a plurality of pointers, creating a collection of recovery control blocks based the collection of control blocks, each recovery control block including a corresponding copy of the eye catcher value and the plurality of pointers, storing a control block memory location for each control block in the collection of control blocks and a recovery memory location for each recovery control block in the collection of recovery control blocks in a recovery table, analyzing the collection of control blocks to determine that a corruption exists, determining a corruption type, the corruption type comprises an infrastructure corruption and or a control block corruption, and initiating a remedial action for the collection of control blocks based at least in part on the corruption type.

20 Claims, 7 Drawing Sheets

(56) References Cited

OTHER PUBLICATIONS

Anonymous, "Network Element Database Pre-Scan Before Upgrade/Restore Operations, Securing Database Backup Image, and Integrity Audits", IP.COM No. IPCOM000249665D, Mar. 15, 2017, 16 pages.
B. Chen et al., "Robust Dynamic Provable Data Possession", Proceedings of SPCC '12 [35], 2015, 13 pages.
Desmond, et al. "Recovering Dynamic System Data," U.S. Appl. No. 16/515,208, filed Jul. 18, 2019.
IBM: List of IBM Patents or Patent Applications Treated as Related (Appendix P); Date Filed: Dec. 9, 2020; 2 pages.
K. Bai et al., "A Data Damage Tracking Quarantine and Recovery (DTQR) Scheme for Mission-Critical Database Systems", ACM EDBT, Mar. 24-26, 2009, pp. 720-731.
R. Schulman, "Disaster Recovery Issues and Solutions", Enterprise Storage, Hitachi Data Systems, Dec. 2003, 23 pages.
Siemens et al., "Methods and Apparatus for Power-Outage-Tolerant Data Persistency of Mission-Critical Software," IP.COM No. IPCOM000212889D, Nov. 30, 2011, 4 pages.

| Header: Entry Count = 4 | |
|---|---|
| Entry #1 | 00001000 | 00201000 |
| Entry #2 | 00002000 | 00202000 |
| Entry #3 | 00003000 | 00203000 |
| Entry #4 | 00004000 | 00204000 |

FIG. 7 ns described therein without departing from the spirit of the invention. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

RECOVERING DYNAMIC SYSTEM DATA

DOMESTIC PRIORITY

This application is a continuation of U.S. patent application Ser. No. 16/515,208, filed Jul. 18, 2019, the disclosure of which is incorporated by reference herein in its entirety.

BACKGROUND

The present invention generally relates to recovering system dynamic data, and more specifically, to recovering system dynamic data without an outage or delay.

System availability becomes more and more necessary in a global economy since many businesses rely heavily on information technology (IT) systems to conduct business either internally or externally to a customer or client. That being said, most businesses require their IT systems to be available continuously without interruption even on non-business days. System dynamic data is data that must be available when requested, resides in a main memory, and changes regularly within a runtime environment. Common storage is defined as main memory accessible to multiple applications running on a system. Frequently a computer system's critical dynamic data resides in common storage so that multiple product components can access it. Because the dynamic data is being stored in common storage, it opens up the data to being corrupted by others.

SUMMARY

Embodiments of the present invention are directed to a computer-implemented method for system dynamic data recovery. A non-limiting example of the computer-implemented method includes creating a collection of control blocks associated with one or more catalogs, wherein each control block in the collection of control blocks includes an eye catcher value and a plurality of pointers, creating a collection of recovery control blocks based at least in part on the collection of control blocks, wherein each recovery control block in the collection of recovery control blocks includes a corresponding copy of the eye catcher value and the plurality of pointers, storing a control block memory location for each control block in the collection of control blocks and a recovery memory location for each recovery control block in the collection of recovery control blocks in a recovery table, analyzing the collection of control blocks to determine that a corruption exists, determining a corruption type, wherein the corruption type includes one or both of an infrastructure corruption and or a control block corruption, and initiating a remedial action for the collection of control blocks based at least in part on the corruption type.

Embodiments of the present invention are directed to a system for system dynamic data recovery. A non-limiting example of the system includes a processor configured to perform creating a collection of control blocks associated with one or more catalogs, wherein each control block in the collection of control blocks includes an eye catcher value and a plurality of pointers, creating a collection of recovery control blocks based at least in part on the collection of control blocks, wherein each recovery control block in the collection of recovery control blocks includes a corresponding copy of the eye catcher value and the plurality of pointers, storing a control block memory location for each control block in the collection of control blocks and a recovery memory location for each recovery control block in the collection of recovery control blocks in a recovery table, analyzing the collection of control blocks to determine that a corruption exists, determining a corruption type, wherein the corruption type includes one or both of an infrastructure corruption and or a control block corruption, and initiating a remedial action for the collection of control blocks based at least in part on the corruption type.

Embodiments of the invention are directed to a computer program product for system dynamic data recovery, the computer program product including a computer readable storage medium having program instructions embodied therewith. The program instructions are executable by a processor to cause the processor to perform a method. A non-limiting example of the method includes creating a collection of control blocks associated with one or more catalogs, wherein each control block in the collection of control blocks includes an eye catcher value and a plurality of pointers, creating a collection of recovery control blocks based at least in part on the collection of control blocks, wherein each recovery control block in the collection of recovery control blocks includes a corresponding copy of the eye catcher value and the plurality of pointers, storing a control block memory location for each control block in the collection of control blocks and a recovery memory location for each recovery control block in the collection of recovery control blocks in a recovery table, analyzing the collection of control blocks to determine that a corruption exists, determining a corruption type, wherein the corruption type includes one or both of an infrastructure corruption and or a control block corruption, and initiating a remedial action for the collection of control blocks based at least in part on the corruption type.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide a process that allows corrupted system dynamic data to be detected and recovered on-the-fly without an outage or a noticeable delay. The system dynamic data, in some embodiments, can be referred to as control blocks that are utilized in a storage management system. A storage management system is utilized for managing the storage of datasets of a customer. For these storage management systems, the system, rather than a user, determines data placement and handles data backup, movement, space, and security. The storage management systems create a catalog for each dataset for a customer. Whenever a catalog is created, the system creates a control block. The control blocks include information such as, for example, a catalog name, the device the catalog resides on, a record length of the records in the catalog, and pointers to other control blocks that are needed for input/output (I/O) to the catalog. The control blocks for the various catalogs in a system are chained together utilizing pointers. However, issues arise when these control blocks are corrupted. Typically, when corruption is detected, the entire system requires a reboot which can cause issues with customer access to the system and generally, interrupts the customers business operations. Also, with this type of corruption of the control blocks, the issue is not detected for hours, days, or weeks. When too much time has passed, it can be challenging to diagnose how the corruption occurred.

One or more embodiments of the present invention address one or more of the above-described shortcomings of the prior art by providing processes that allows corrupted system dynamic data to be detected sooner and then recovered with out the need for a reboot of the storage system. One or embodiments of the invention utilizes a protected recovery table and a protected copy of the dynamic data (e.g., control blocks, etc.) to rebuild the corrupted data that resides in a common storage location. Herein, protected storage includes storage that is only accessible by the application that owns the data. This process allows for the corruption to be detected almost immediately so that system traces and logs still hold diagnostic information to determine the cause of the corruption.

Figure 1:
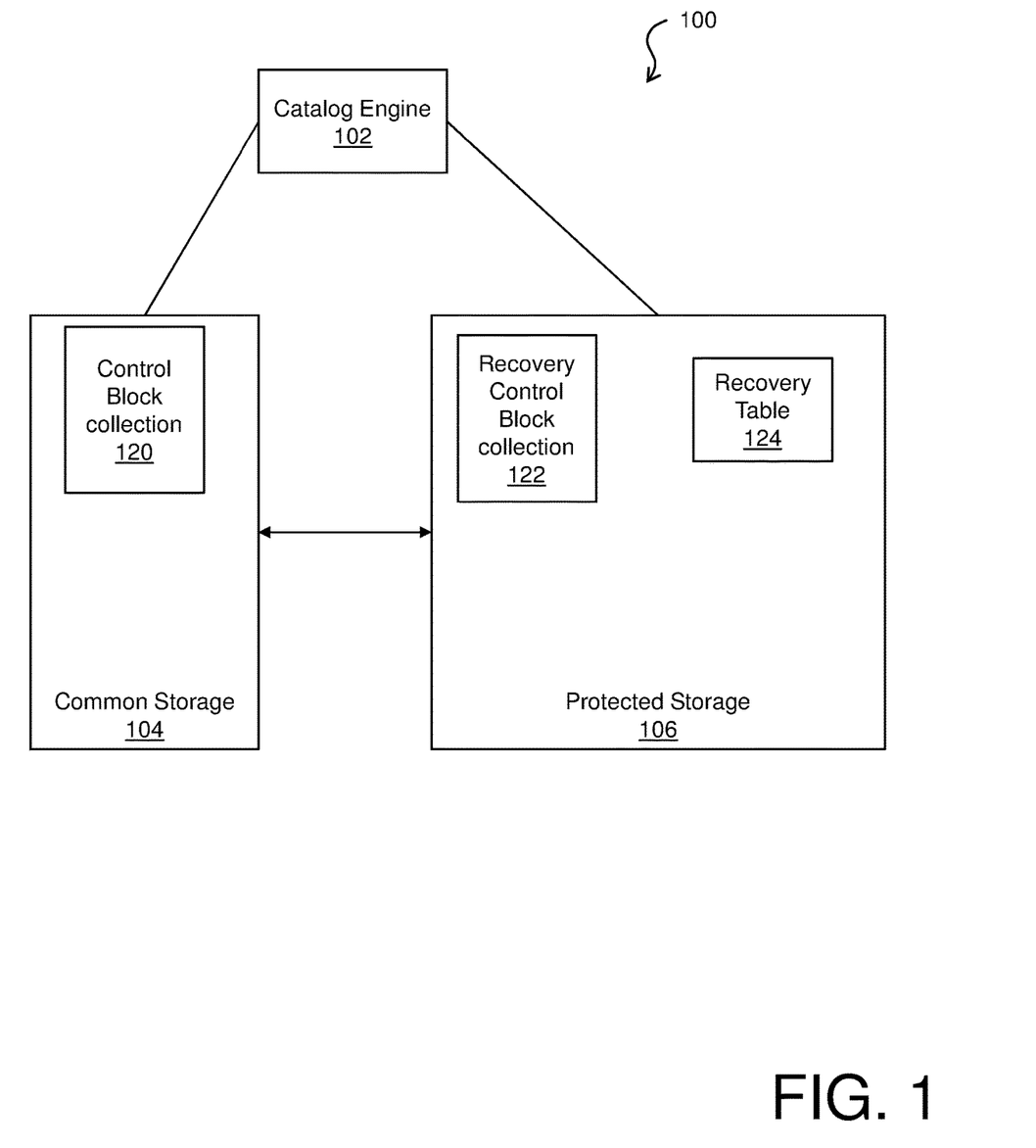
FIG. 1 depicts a block diagram of a system for data recovery in accordance with one or more embodiments of the present invention.

Turning now to FIG. 1, block diagram of a system for data recovery is generally shown in accordance with one or more embodiments of the present invention. The system 100 includes a catalog engine 102 that controls the storage management system as well as the dynamic data stored therein. The system 100 includes a common storage 104 and a protected storage 106. The system dynamic data is in the form of control blocks 120 which reside in the common storage 104 and the control blocks 120 are chained together in a collection. Chaining the control blocks 120 together is an exemplary configuration and is not intended to limit the collection of control blocks described herein. The chain of control blocks 120 and recovery control blocks 122 can also be referred to as a collection of control blocks and recovery control blocks. The control blocks 120 can be accessed by multiple applications that interact with the system 100. Since these control blocks 120 can be accessed by multiple applications at the same time, these control blocks 120 can be serialized for shared or exclusive access. The system 100 also includes a chain of recovery control blocks 122 and a recovery table 124 that reside in the protected storage 106. These recovery control blocks 122 can be utilized to rebuild/repair any corruption to the dynamic data (e.g., control block 120) in the common storage 104. In addition, the recovery table 124 includes pointers to the control blocks 120 in common storage 104 so that the control blocks 120 can never be lost even when the corruption in common storage 104 includes corruption to any chain pointers.

In one or more embodiments of the invention, the catalog engine 102 can perform the following process steps within the system 100. When each control block 120 is created in common storage 104, the address of the control block is saved in the recovery table 124 and a copy of the control block 120 is created in the protected storage 106. These copies of the control blocks 120 are referred to as recovery control block 122. At regular intervals, or on-demand, the system dynamic data is checked for corruption. Corruption can also be detected and repaired in error interrupt routines that receive control when the catalog engine 102 detects a storage reference issue. When corruption is found, the recovery control blocks 122 are utilized to rebuild the control blocks 120 in common storage. The chaining of the control blocks 120 and the recovery control block 122 will be described in greater detail in FIG. 2.

In one or more embodiments of the invention, the system 100 can be susceptible to two types of corruption that would need to be detected. The first type of corruption includes a chain corruption. The chain is said to be corrupted when a chain pointer is found to be pointing to an invalid control block. An eye catcher field in the control blocks can be utilized to verify that the pointers for a chain are corrupted. When a chain corruption occurs, the entire chain of control blocks 120 can no longer be trusted. In this case, the entire chain of control block 120 is then serialized for exclusive access and the chain pointers and eye catcher field/values are restored from the recovery table 124 without checking any additional pointers. Since this repair of the control blocks is limited to reassigning the pointer and eye catcher values, the exclusive access of the chain of control blocks 120 is held for a relatively short amount of time causing minimal contention on the storage management system. The second type of corruption includes a control block corruption. An individual control block is corrupted when data in the control block, other than the chain pointers and the eye catcher values, are found to be invalid. To repair the control block corruption, only the individual control block is to be serialized for exclusive access while the common storage control block is repaired from the copy in the protected storage.

In one or more embodiments, the catalog engine 102 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form. In one or embodiments of the invention, the catalog engine 102 can be implemented on the processing system 700 found in FIG. 7. Additionally, the cloud computing system 50 (from FIG. 5) can be in wired or wireless electronic communication with one or all of the elements of the system 100. Cloud 50 can supplement, support or replace some or all of the functionality of the elements of the system 400. Additionally, some or all of the functionality of the elements of system 100 can be implemented as a node 10 (shown in FIGS. 5 and 6) of cloud 50. Cloud computing node 10 is only one example of a suitable cloud computing node and is not intended to suggest any limitation as to the scope of use or functionality of embodiments of the invention described herein.

Figure 2:
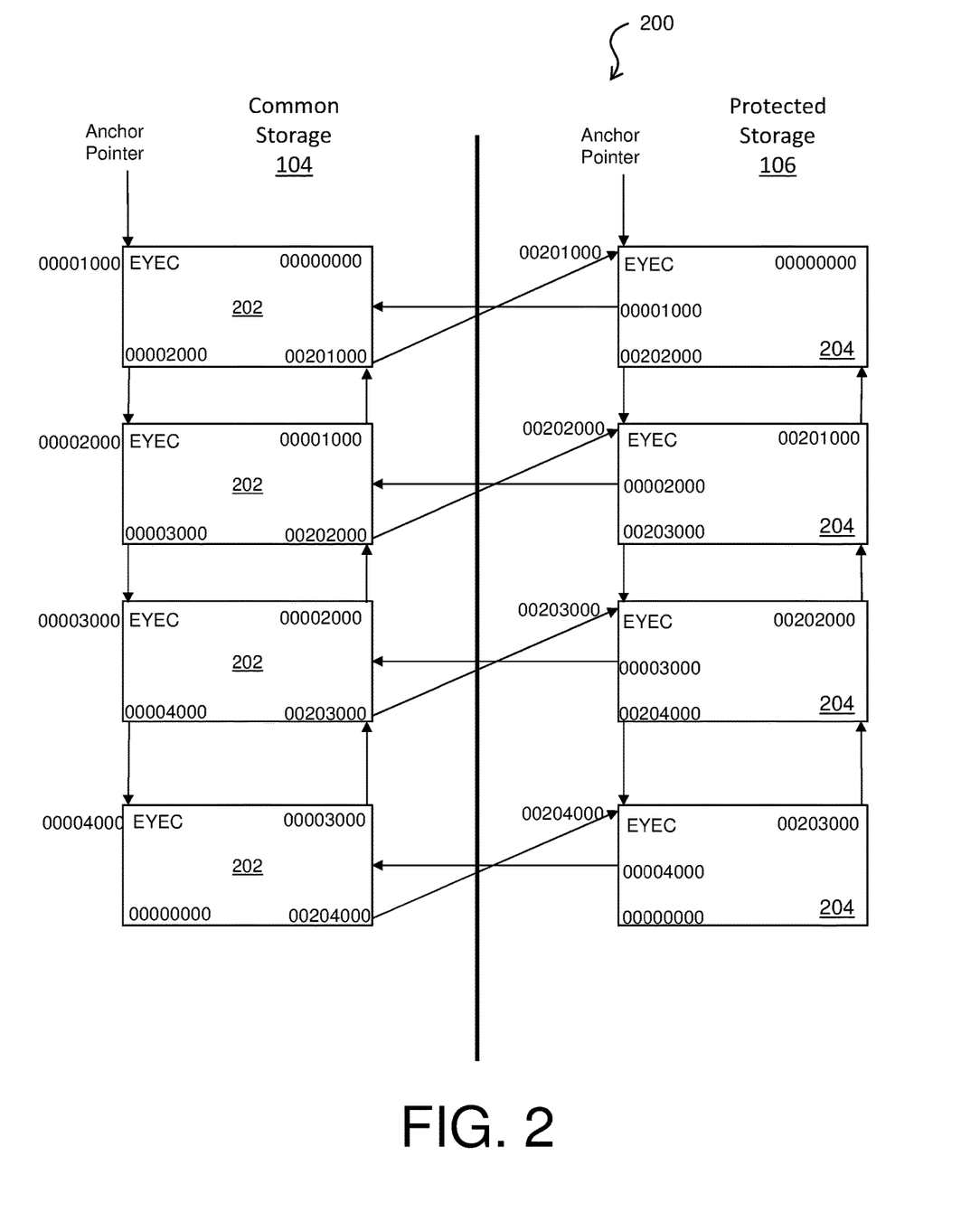
FIG. 2 depicts a block diagram of the chain of control blocks and the chain of recovery control blocks according to one or more embodiments of the invention.

FIG. 2 depicts a block diagram of the chain of control blocks and the chain of recovery control blocks according to one or more embodiments of the invention. The diagram 200 includes the common storage 104 with the chain of control blocks 202. Each control block 202 includes pointers as well as an eye catcher (EPEC). The control blocks 202 in common storage 104 include forward and backwards chain pointers to complete the chain. In addition, the control blocks 202 include pointers to corresponding recovery control blocks 204 residing in the protected storage 106. In one or more embodiments of the invention, the control blocks 202 in common storage 104 include both forward and backward chain pointers for ease of repair. These pointers can be at opposite ends of the control blocks to help avoid both pointers being corrupted at the same. The recovery control blocks 204 are also chained forward and back for convenience. The corresponding control blocks 202 and recovery control blocks 204 point to each other. In one or more embodiments of the invention, the corruption detection can be performed frequently. For example, the detection can occur every 30 seconds or less.

Figure 3:
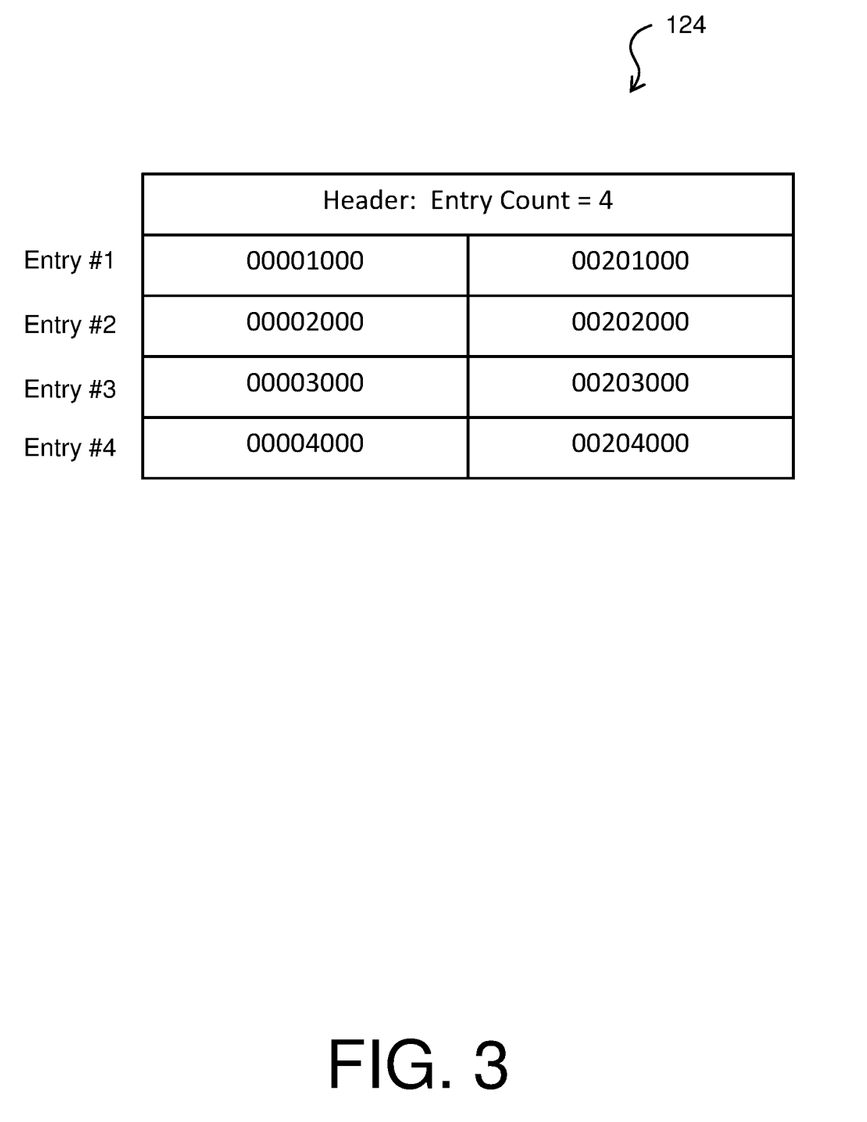
FIG. 3 depicts an example recovery table according to one or more embodiments of the invention.

FIG. 3 depicts an example recovery table according to one or more embodiments of the invention. The recovery table 124 includes entries for two pointers which are the address of both the control block in common storage and the recovery control block in the protected storage. These addresses mirror the addresses for control blocks 202 in FIG. 2. As shown, entry #1 refers to the first control block in the chain with address of '00001000' and the first recovery control block in the chain with an address of '00201000'. The remaining entries (#2, #3, #4) refer to the remaining control blocks 202 in the chains found in common and protected storage. In some embodiments of the invention, system 100 can maintain a count of the entries in the recovery table 124 that can be utilized as an index to the next available entry. For example, if the count is 4, then add one to get to the next available entry (e.g., 5).

Figure 4:
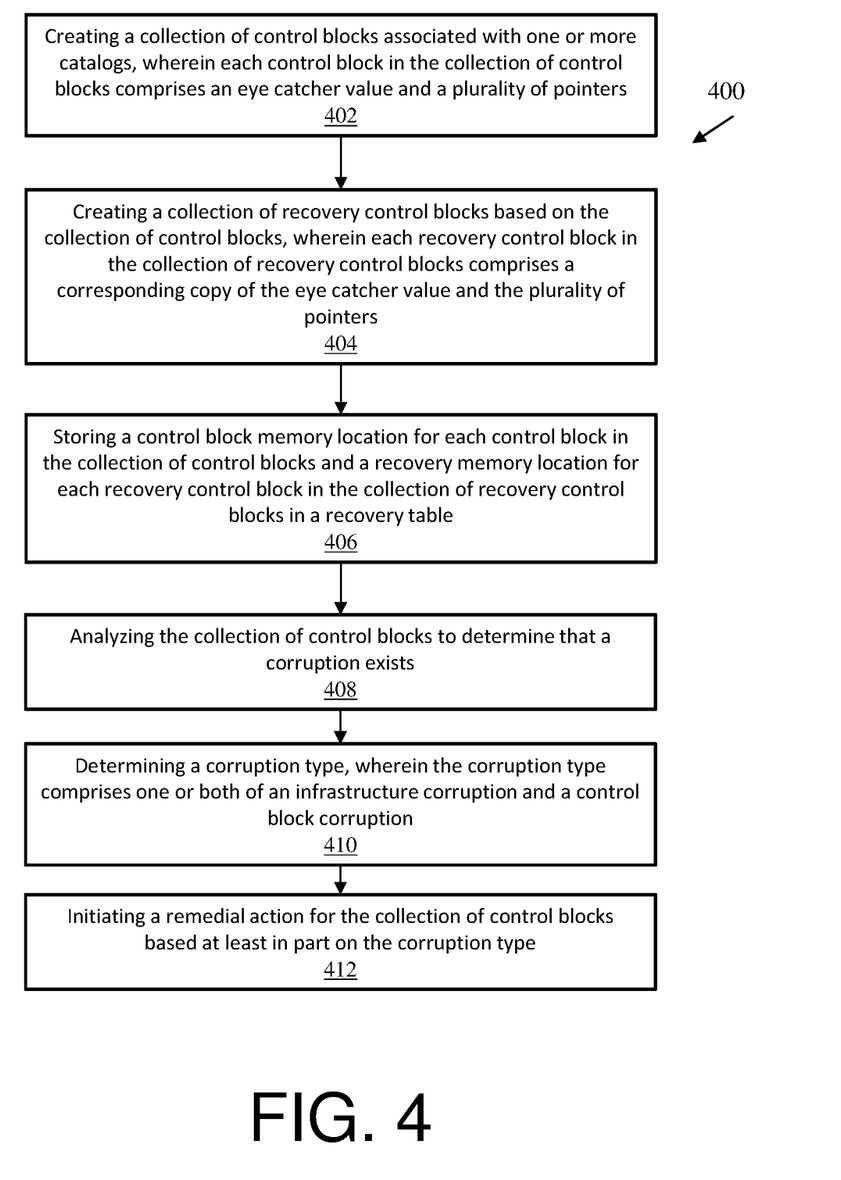
FIG. 4 depicts a flow diagram of a method for dynamic data recovery according to one or more embodiments of the invention.

FIG. 4 depicts a flow diagram of a method for dynamic data recovery according to one or more embodiments of the invention. The method 400 includes creating a collection of control blocks associated with one or more catalogs, wherein each control block in the collection of control blocks includes an eye catcher value and a plurality of pointers, as shown in block 402. At block 404, the method 400 includes creating a collection of recovery control blocks based on the collection of control blocks, wherein each recovery control block in the collection of recovery control blocks includes a corresponding copy of the eye catcher value and the plurality of pointers. The method 400, at block 406, also includes storing a control block memory location for each control block in the collection of control blocks and a recovery memory location for each recovery control block in the collection of recovery control blocks in a recovery table. The method 400 also includes analyzing the collection of control blocks to determine that a corruption exists, as shown in block 408. Then, at block 410, the method 400 includes determining a corruption type, wherein the corruption type includes one or both of an infrastructure corruption and a control block corruption. And at block 412, the method 400 includes initiating a remedial action for the chain of control blocks based at least in part on the corruption type.

Additional processes may also be included. It should be understood that the processes depicted in FIG. 4 represent illustrations, and that other processes may be added or existing processes may be removed, modified, or rearranged without departing from the scope and spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
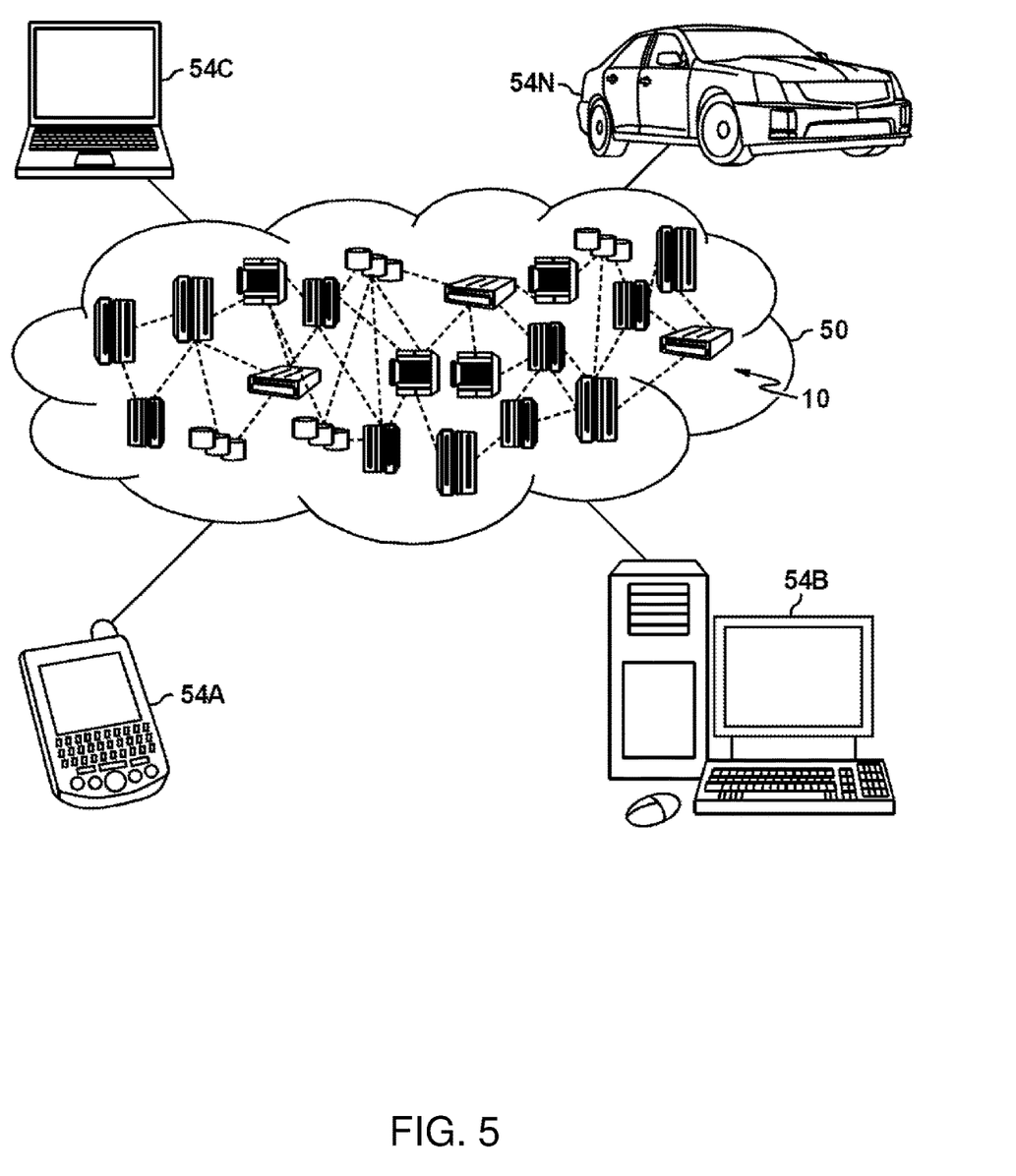
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
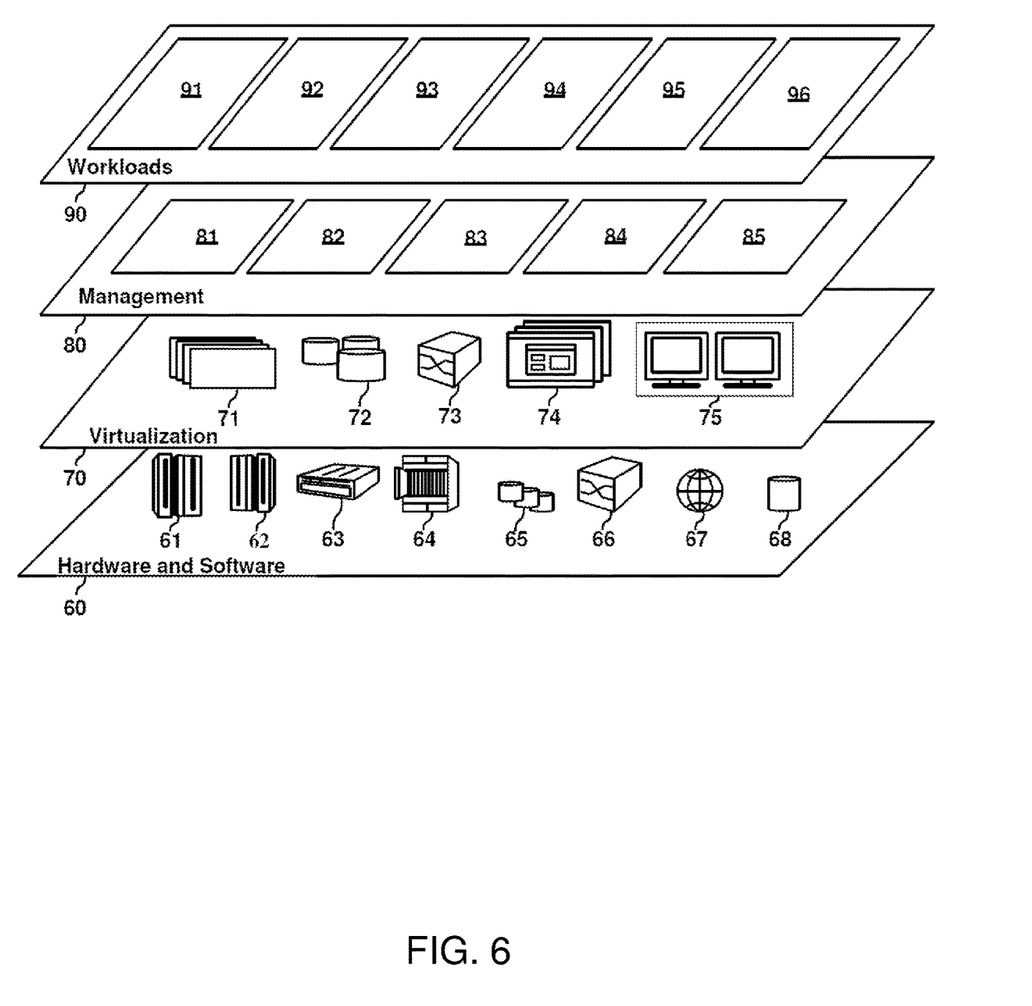
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recovery of system dynamic data 96.

Figure 7:
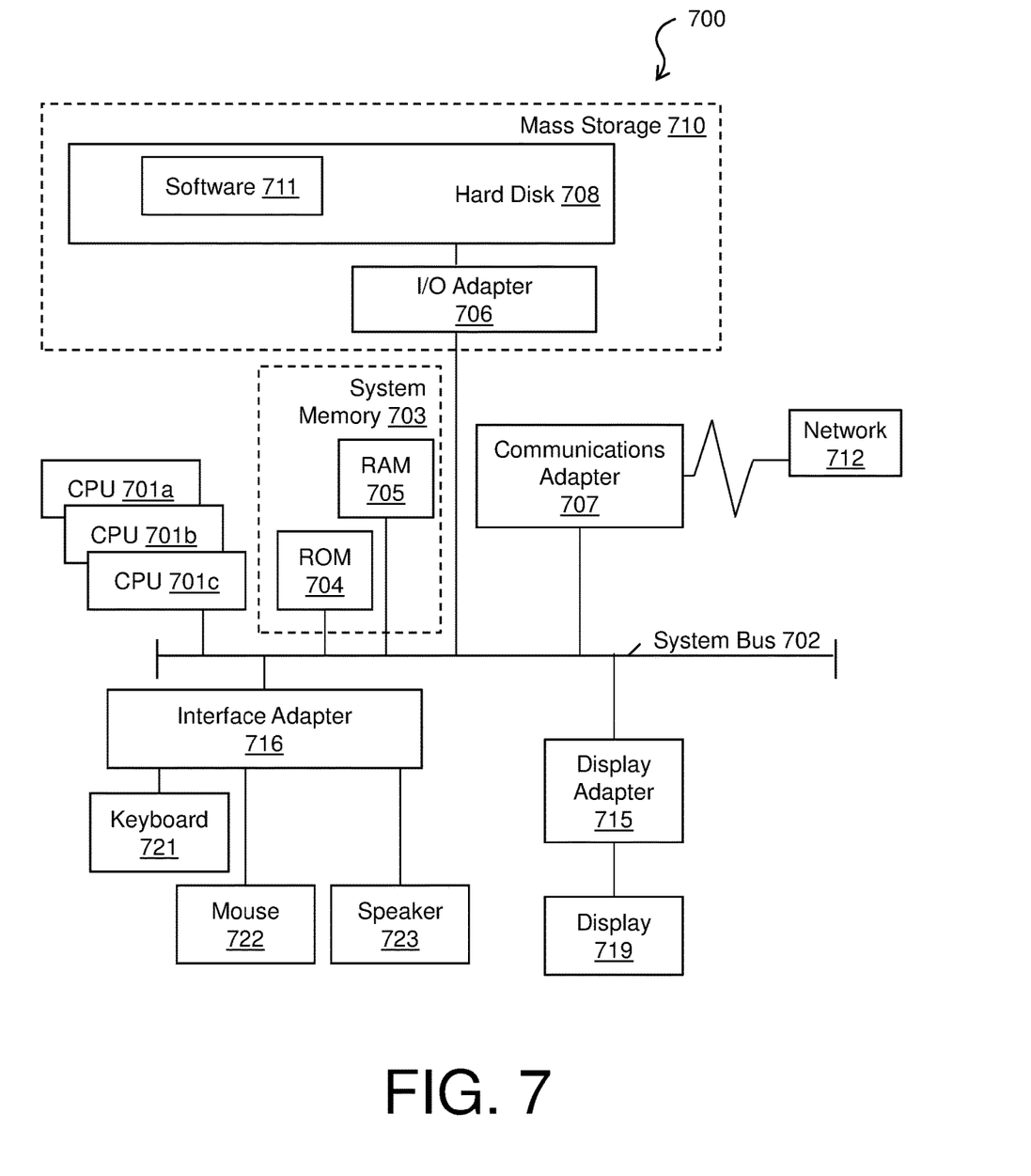
FIG. 7 depicts a block diagram of a computer system for use in implementing one or more embodiments of the present invention.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and in one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for data recovery, the method comprising:
    creating a collection of control blocks associated with one or more catalogs, wherein each control block in the collection of control blocks comprises an eye catcher value and a plurality of pointers;
    creating a collection of recovery control blocks based at least in part on the collection of control blocks, wherein each recovery control block in the collection of recovery control blocks comprises a corresponding copy of the eye catcher value and the plurality of pointers;
    storing a control block memory location for each control block in the collection of control blocks and a recovery memory location for each recovery control block in the collection of recovery control blocks in a recovery table;
    determining a corruption type for the collection of control blocks; and
    initiating a remedial action for the collection of control blocks based at least in part on the corruption type.

2. The computer-implemented method of claim 1, wherein determining the corruption type comprises:
    analyzing a value of the eye catcher value to verify the one or more pointers in each control block in the collection of control blocks;
    determining that the type of corruption is an infrastructure corruption based on determining that the eye catcher value is incorrect.

3. The computer-implemented method of claim 1, further comprising:
    based on a determination that the type of corruption is a collection corruption, initiating the remedial action comprises:
    restoring the collection of control blocks based on the collection of recovery control blocks and the recovery table.

4. The computer-implemented method of claim 3, wherein restoring the collection of control blocks based on the collection of recovery control blocks and the recovery table comprises:
    serializing the collection of control blocks; and
    restoring the one or more collection pointers for each control block in the set of control blocks from the recovery table.

5. The computer-implemented method of claim 1, further comprising:
    based on a determination that the type of corruption is a control block corruption, initiating the remedial action comprises:
    determining that at least one field of a corrupted control block in the collection of control blocks is corrupted;

replacing the corrupted control block with a corresponding recovery control block from the collection of recovery control blocks.

6. The computer-implemented method of claim 1, wherein the collection of control blocks is stored in a first storage;
wherein the collection of recovery control blocks is stored in a second storage; and
wherein the recovery table is stored in the second storage.

7. The computer-implemented method of claim 6, wherein the first storage comprises a common storage; and the second storage comprises a protected storage.

8. The computer-implemented method of claim 1, wherein the plurality of pointers comprises a forward pointer and a backwards pointer.

9. The computer-implemented method of claim 8, wherein the forward pointer is stored in a first memory location in a control block;
wherein the backwards pointer is stored in a second memory location in the control block; and
wherein the first memory location and the second memory locations are located at opposite ends of the data control blocks.

10. The computer-implemented method of claim 1, wherein analyzing the collection of control blocks to determine that a corruption exists is performed periodically.

11. A system for data recovery comprising:
a memory having computer readable instructions; and
one or more processors for executing the computer readable instructions, the computer readable instructions controlling the one or more processors to perform operations comprising:
creating a collection of control blocks associated with one or more catalogs, wherein each control block in the collection of control blocks comprises an eye catcher value and a plurality of pointers;
creating a collection of recovery control blocks based at least in part on the collection of control blocks, wherein each recovery control block in the collection of recovery control blocks comprises a corresponding copy of the eye catcher value and the plurality of pointers;
storing a control block memory location for each control block in the collection of control blocks and a recovery memory location for each recovery control block in the collection of recovery control blocks in a recovery table;
determining a corruption type for the collection of control blocks; and
initiating a remedial action for the collection of control blocks based at least in part on the corruption type.

12. The system of claim 11, wherein determining the corruption type comprises:
analyzing a value of the eye catcher value to verify the one or more pointers in each control block in the collection of control blocks;
determining that the type of corruption is an infrastructure corruption based on determining that the eye catcher value is incorrect.

13. The system of claim 11, further comprising:
based on a determination that the type of corruption is an infrastructure corruption, initiating the remedial action comprises:
restoring the collection of control blocks based on the collection of recovery control blocks and the recovery table.

14. The system of claim 13, wherein restoring the collection of control blocks based on the collection of recovery control blocks and the recovery table comprises:
serializing the collection of control blocks; and
restoring the one or more collection pointers for each control block in the set of control blocks from the recovery table.

15. The system of claim 11, further comprising:
based on a determination that the type of corruption is a control block corruption, initiating the remedial action comprises:
determining that at least one field of a first control block in the collection of control blocks is corrupted;
replacing the first control block with a corresponding first recovery control block from the collection of recovery control blocks.

16. A computer program product for data recovery comprising a computer readable storage medium having program instructions embodied therewith, the program instructions executable by a processor to cause the processor to perform operations comprising:
creating a collection of control blocks associated with one or more catalogs, wherein each control block in the collection of control blocks comprises an eye catcher value and a plurality of pointers;
creating a collection of recovery control blocks based at least in part on the collection of control blocks, wherein each recovery control block in the collection of recovery control blocks comprises a corresponding copy of the eye catcher value and the plurality of pointers;
storing a control block memory location for each control block in the collection of control blocks and a recovery memory location for each recovery control block in the collection of recovery control blocks in a recovery table;
determining a corruption type for the collection of control blocks; and
initiating a remedial action for the collection of control blocks based at least in part on the corruption type.

17. The computer program product of claim 16, wherein determining the corruption type comprises:
analyzing a value of the eye catcher value to verify the one or more pointers in each control block in the collection of control blocks; and
determining that the type of corruption is a infrastructure corruption based on determining that the eye catcher value is incorrect.

18. The computer program product of claim 16, further comprising:
based on a determination that the type of corruption is a infrastructure corruption, initiating the remedial action comprises:
restoring the collection of control blocks based on the collection of recovery control blocks and the recovery table.

19. The computer program product of claim 18, wherein restoring the collection of control blocks based on the collection of recovery control blocks and the recovery table comprises:
serializing the collection of control blocks; and
restoring the one or more collection pointers for each control block in the set of control blocks from the recovery table.

20. The computer program product of claim 16, further comprising:

based on a determination that the type of corruption is a control block corruption, initiating the remedial action comprises:

determining that at least one field of a first control block in the collection of control blocks is corrupted;

replacing the first control block with a corresponding first recovery control block from the collection of recovery control blocks.

\* \* \* \* \*